United States Patent
Braden et al.

(10) Patent No.: US 11,287,064 B2
(45) Date of Patent: Mar. 29, 2022

(54) HOME APPLIANCE HAVING AN ANTI-ROTATIONAL HOUSING FOR A GAS SUPPLY ORIFICE HOLDER

(71) Applicants: BSH Home Appliances Corporation, Irvine, CA (US); BSH Hausgeräte GmbH, Munich (DE)

(72) Inventors: Ben Braden, Lafollette, TN (US); Josiah Fronckowiak, LaFollette, TN (US); Jesus Garcia, Knoxville, TN (US); Shaun Phillips, Jacksboro, TN (US)

(73) Assignees: BSH Home Appliances Corporation, Irvine, CA (US); BSH Hausgeräte GmbH, Munich (DE)

( * ) Notice: Subject to any disclaimer, the term of this patent is extended or adjusted under 35 U.S.C. 154(b) by 309 days.

(21) Appl. No.: 16/541,209

(22) Filed: Aug. 15, 2019

(65) Prior Publication Data
US 2021/0048121 A1     Feb. 18, 2021

(51) Int. Cl.
| | |
|---|---|
| F16L 3/04 | (2006.01) |
| F24C 3/12 | (2006.01) |
| F16L 3/12 | (2006.01) |
| F16L 3/01 | (2006.01) |
| F16L 3/22 | (2006.01) |
| F24C 3/00 | (2006.01) |

(52) U.S. Cl.
CPC ........ *F16L 3/04* (2013.01); *F16L 3/01* (2013.01); *F16L 3/1215* (2013.01); *F16L 3/221* (2013.01); *F24C 3/00* (2013.01); *F24C 3/122* (2013.01); *F24C 3/126* (2013.01); *F24C 3/002* (2013.01)

(58) Field of Classification Search
CPC .. F24C 3/008; F24C 3/126; F24C 3/00; F24C 3/122; F24C 3/002; F16L 3/04; F16L 3/221; F16L 3/01; F16L 3/1215; F16L 3/003

See application file for complete search history.

(56) References Cited

U.S. PATENT DOCUMENTS

| | | | | |
|---|---|---|---|---|
| 2,516,282 | A * | 7/1950 | Wilton ............... | C21D 1/667 239/273 |
| 4,418,456 | A * | 12/1983 | Riehl ................. | F23D 14/10 239/566 |
| 5,647,341 | A * | 7/1997 | Langman ............ | F24C 3/004 126/512 |
| 6,916,174 | B2 * | 7/2005 | O'Donnell .......... | F23D 14/105 239/432 |

(Continued)

OTHER PUBLICATIONS

How to Build a Heavy Duty Workbench, Ethan, Online: OneProjectCloser.com; Publication date: May 5, 2016.

(Continued)

*Primary Examiner* — Alfred Basichas
(74) *Attorney, Agent, or Firm* — Michael E. Tschupp; Andre Pallapies; Brandon G. Braun (57) ABSTRACT

A home cooking appliance includes a cooking compartment, a gas burner tube in the cooking compartment, a gas supply orifice holder coupled to a gas supply line at a first end and having a gas supply orifice at a second end. The gas supply orifice is configured to inject gas from the gas supply line into the gas burner tube. The home cooking appliance further includes an anti-rotational housing fixing a position of the gas supply orifice holder with respect to the gas burner tube.

19 Claims, 9 Drawing Sheets

(56) References Cited

U.S. PATENT DOCUMENTS

2006/0082134 A1     4/2006  Guigon
2016/0320071 A1*  11/2016  Seok .................... F24C 15/322

OTHER PUBLICATIONS

Corner fitting angle brace; Metal Market; Online: AliExpress.com; Publication Date: Unknown. Dec. 13, 2018.
Stainless Steel Bracket; Manufacturer: DeckLock; Online: HomeDepot.com; Unknown. Accessed Dec. 14, 2018.
Strong-Tie Fence Bracket; Simpson; Online: DoitBest.com; Publication Date: Unknown. Accessed Dec. 17, 2018.
Vinyl Fence Bracket Kit; Veranda; Online: HomeDepot.com; Publication Date: Unknown. Accessed Dec. 14, 2018.

* cited by examiner

HOME APPLIANCE HAVING AN ANTI-ROTATIONAL HOUSING FOR A GAS SUPPLY ORIFICE HOLDER

FIELD OF THE INVENTION

The present invention is directed to a home cooking appliance having an anti-rotational housing for a gas supply orifice holder of a gas burner assembly.

BACKGROUND OF THE INVENTION

A conventional home cooking appliance, such as a free standing range (FSR), may include a housing having one or more cooking compartments, such as a gas baking oven, convection oven, steam oven, warming drawer, etc., and one or more cooking surfaces formed, for example, by cooking grates disposed over gas burners on top of the housing. Such a cooking compartment can include a gas burner assembly including a gas burner tube (e.g., a bake tube) that is supplied with gas from a gas supply line via a gas supply orifice. A gas supply orifice holder may be provided to couple the gas supply line to the gas supply orifice and convey the gas from the gas supply line to the gas supply orifice.

SUMMARY OF THE INVENTION

An exemplary embodiment of the invention comprises a home cooking appliance including a cooking compartment, a gas burner tube in the cooking compartment, a gas supply orifice holder coupled to a gas supply line at a first end and having a gas supply orifice at a second end, the gas supply orifice configured to inject gas from the gas supply line into the gas burner tube, and an anti-rotational housing fixing a position of the gas supply orifice holder with respect to the gas burner tube. The anti-rotational housing according to the present invention can provide stability to the gas supply orifice holder and ensure that the gas burner assembly (e.g., bake burner assembly) is properly aligned (e.g., centered) with respect to the gas burner tube (e.g., bake tube) and properly seated, for example, at the rear of the housing of the home cooking appliance at all phases throughout the lifetime of the home cooking appliance, such as during manufacturing, assembly, testing, transporting, installation, use, and service of the home cooking appliance.

Other features and advantages of the present invention will be described below. To provide a better understanding of the invention, and for further clarification and background of the present invention, various aspects and considerations of a home cooking appliance having a cooking compartment with a gas burner assembly, which have been recognized by the present invention, first will be explained in greater detail.

The present invention recognizes that various factors throughout the lifetime of a home cooking appliance may cause or result in one or more parts of a gas burner assembly of a cooking compartment being misaligned or damaged, which in turn may result in, for example, poor burner performance, the burner assembly not working properly or failing, the burner assembly failing testing (e.g., ANSI test requirements, manufacturer's internal test requirements and tolerances, etc.), among other things. For example, the present invention recognizes that maintaining a properly centered alignment of the gas orifice with the gas burner tube is extremely difficult during ordinary and conventional assembly processes of coupling the gas supply line to the gas supply orifice holder. During initial assembly of a gas supply line to a gas supply orifice holder, a gas supply orifice holder (e.g., a long neck or elbow of gas supply orifice holder) has the potential to easily move out of center with respect to the gas burner tube when the gas supply line is assembled with the gas supply orifice holder. The gas supply orifice holder may be misaligned, or even bent or damaged, during a process of tightening (or overtightening) the gas supply line on the gas supply orifice holder. As a result, the gas may not flow down the center of the gas burner tube, but instead, may flow toward or hit the side of the bake tube, thereby producing poor gas flow to the gas burner tube and causing sooting to the flame spreader gas burner tube resulting in poor burner performance or failure of the gas burner. The present invention further recognizes that, during such assembly, a gas burner assembly may not seat properly on a rear panel of the cooking compartment, thereby similarly causing or compounding poor burner performance, the burner assembly not working properly, the burner failing, etc. If the gas burner assembly is not properly seated through the rear panel, the gas burner tube may not engage into the housing. These problems may further result in the burner assembly failing testing, such as ANSI test requirements, manufacturer's internal test requirements and tolerances, etc.

The present invention further recognizes that, with conventional arrangements, a bending moment may exist at the end of the gas orifice. As a result, during transporting, delivery, and installation of the home cooking appliance, the gas orifice may move out of center with respect to the gas burner tube as a result of the weight and varying length (e.g., different length per SKU, model, etc.) of the gas supply line, vibrations of the transportation vehicle, and the installation process, etc. The present invention also recognizes that the gas orifice may move out of center with respect to the gas burner tube during service performed on the gas burner assembly.

Accordingly, the present invention recognizes that there is a need to effectively provide stability and proper alignment of a gas orifice with respect to a gas burner tube of a burner assembly during all phases throughout the lifetime of the home cooking appliance, such as during manufacturing, assembly, testing, transporting, installation, use, and service of the home cooking appliance.

The present invention solves these and other problems by providing a home cooking appliance including an anti-rotational housing fixing a position of the gas supply orifice holder with respect to the gas burner tube. In this way, the present invention can provide stability to the gas supply orifice holder and ensure that the gas burner assembly (e.g., bake burner assembly) is properly aligned (e.g., centered) with respect to the gas burner tube (e.g., bake tube) and properly seated, for example, at the rear of the housing of the home cooking appliance at all phases throughout the lifetime of the home cooking appliance, such as during manufacturing, assembly, testing, transporting, installation, use, and service of the home cooking appliance, thereby increasing the longevity and quality of the appliance.

During initial assembly, the exemplary anti-rotational housing can prevent the gas supply orifice holder (e.g., a long neck or elbow of the gas supply orifice holder) from moving out of center with respect to the gas burner tube when the gas supply line is assembled with the gas supply orifice holder, thereby maintaining proper alignment and preventing bending or damage during a process of tightening (or overtightening) the gas supply line on the gas supply orifice holder. As a result, proper gas flow to the gas burner tube can be maintained and sooting to the flame spreader gas burner tube can be prevented, thereby improving burner performance and preventing failure. The exemplary anti-rotational housing also can assist with and improve proper seating of the gas burner assembly on a rear panel of the cooking compartment, thereby providing proper engagement of the gas burner tube into the housing. The exemplary anti-rotational housing can improve compliance with testing requirements, such as ANSI test requirements, manufacturer's internal test requirements and tolerances, etc.

During transporting, delivery, and installation of the home cooking appliance, the exemplary anti-rotational housing can prevent rotation of the gas supply orifice holder, thereby maintaining the gas orifice in the proper position with respect to the gas burner tube, resulting in an improvement of successful installation rates at a customer site.

During service of the gas burner assembly or replacement of the orifice for LP units, the exemplary anti-rotational housing can stabilize and fix a position of the gas supply orifice holder while the gas supply line is removed and re-installed, thereby keeping the gas orifice centered and the gas burner assembly operating successfully.

In an exemplary embodiment, a portion of the gas supply orifice holder can be disposed within the anti-rotational housing and the gas supply orifice can be centered with respect to the gas burner tube when the portion of the gas supply orifice holder is disposed within the anti-rotational housing. The anti-rotational housing can include a hollow interior space having a size and shape that corresponds to a size and shape of the portion of the gas supply orifice holder such that the anti-rotational housing fixes the position (e.g., rotational position) of the gas supply orifice holder with respect to the gas burner tube. In some examples, the gas supply orifice holder can include an elbow such that the first end of the gas supply orifice holder is disposed at an angle (e.g., a 90° angle) with respect to the second end of the gas supply orifice holder, and wherein a portion of the elbow is disposed within the anti-rotational housing. The anti-rotational housing can include a hollow interior space having a size and shape that corresponds to a size and shape of the elbow of the gas supply orifice holder such that the anti-rotational housing fixes the position (e.g., rotational position) of the gas supply orifice holder with respect to the gas burner tube.

In some examples, the anti-rotational housing can include two adjacent open sides (e.g., a box-shaped body having two adjacent open sides) configured to receive a portion of the gas supply orifice holder. In an example, the anti-rotational housing can include a box-shaped body having a plurality of sidewalls defining a top wall, a rear wall adjacent to the top wall and extending perpendicular to the top wall, a side wall adjacent to the top wall and the rear wall and extending perpendicular to each of the top wall and the rear wall, a first side wall adjacent to the top wall and the rear wall and extending perpendicular to each of the top wall and the rear wall, a second side wall adjacent to the top wall and the rear wall and extending perpendicular to each of the top wall and the rear wall and parallel to the first side wall, a bottom opening that is opposite the top wall, and a front opening that is opposite the rear wall and adjacent to the bottom opening. The bottom opening and front opening can cooperate to permit a portion of the gas supply orifice holder to be received within the anti-rotational housing without interfering with the gas supply orifice supplying gas to the gas burner tube and without interfering with the coupling of the gas supply line to the gas supply orifice holder while fixing the position (e.g., rotational position) of the gas supply orifice holder with respect to the gas burner tube.

During assembly, the anti-rotational housing can be fit over the gas supply orifice holder (or, vice versa, the gas supply orifice holder can be fit into the anti-rotational housing), thereby fixing a position of the gas supply orifice holder with respect to the anti-rotational housing and correspondingly fixing a position of the gas supply orifice holder with respect to the gas burner tube.

In some examples, the anti-rotational housing can be configured to provide a predetermined maximum gap between the portion (e.g., elbow) of the gas supply orifice holder that is disposed within the anti-rotational housing and an inner wall of the anti-rotational housing. The predetermined maximum gap can be, for example, 0.5 mm, 1 mm, or within a range of 0.5 mm to 1 mm. The anti-rotational housing limits rotational movement of the gas supply orifice holder with respect to the gas burner tube to a predetermined maximum rotational movement of, for example, 0.5 mm, 1 mm, or within a range of 0.5 mm to 1 mm. In this way, the exemplary anti-rotational housing can act like a secondary wrench when tightening or loosening the gas supply line such that the gas supply orifice holder can be prevented from rotating out of center because of the torque used on the gas supply line. By permitting a predetermined maximum rotational movement off center, and/or by providing a predetermined maximum gap between the portion (e.g., elbow) of the gas supply orifice holder and an inner wall of the anti-rotational housing, the anti-rotational housing can account for tolerance indifference as well as movement of the gas supply orifice holder when the gas supply line is either tightened or loosened. When the gas supply line is tightened or loosened, the gas supply orifice holder will hit against an inner wall of the anti-rotational housing, thereby causing a hard stop for the elbow, which will act as a secondary wrench. The predetermined maximum rotational movement allowed by the anti-rotational housing is important for maintaining proper gas flow down the gas burner tube (e.g., down the center of the gas burner tube) and preventing sooting to the flame spreader gas burner tube, thereby improving burner performance and preventing failure.

In addition to limiting rotational movement of the gas supply orifice holder with respect to the gas burner tube, an example of the anti-rotational housing can be configured to limit movement of the gas supply orifice holder in at least one other direction, such as in a direction corresponding to a longitudinal direction of the gas burner tube, and more particularly, in a direction extending away from the gas burner tube.

The exemplary embodiments of the anti-rotational housing can be coupled (e.g., by rivets) to a fixed part of the home cooking appliance prior to assembling the gas burner tube, thereby ensuring that the gas burner tube will be installed properly (or re-installed properly during service, repairs, etc.) when a portion of the gas supply orifice holder is disposed within (e.g., secured or engaged within) the anti-rotational housing. For example, the anti-rotational housing can include a mounting flange or the like configured to couple the anti-rotational housing to a fixed part of the home cooking appliance, such as a part of the burner front cover. In some instances, the fixed part may include one or more openings configured to permit airflow to the gas burner assembly (e.g., primary airflow for mixing with the gas to supply the gas burner tube with an air-gas mixture and secondary airflow for combustion). In an exemplary embodiment of the anti-rotational housing, the mounting flange or the like can include one or more cutouts corresponding to the respective openings of the fixed part to minimize or avoid interference with the airflow through such openings, thereby fixing a position of the gas supply orifice holder with respect to the gas burner tube while maximizing airflow for optimal performance and stability of the gas burner assembly.

The exemplary embodiments of the anti-rotational housing can be simply and easily formed, for example, from a single, unitary part formed, for example, from a rigid material, such as steel (e.g., 14 gauge steel), and configured to be bent into a shape of a box-shaped body with a mounting flange.

According to the invention, the exemplary anti-rotational housing can assist with centering and maintaining a centered position of the gas orifice with respect to the gas burner tube during all phases throughout the lifetime of the home cooking appliance, such as during manufacturing, assembly, testing, transporting, installation, use, and service of the home cooking appliance. Among other things, the features of the exemplary embodiments of the anti-rotational housing can improve or guarantee proper installation of a gas burner tube, improve successful installation rates at a customer site, ensure proper alignment when changing over to LP in the field, for example, using an LP conversion kit, or during a service call to replace a gas burner tube and/or gas orifice. The features of the exemplary embodiments of the anti-rotational housing can improve or ensure proper gas flow from the gas orifice to the gas burner tube and prevent sooting on the flame spreader gas burner tube. The exemplary embodiments of the anti-rotational housing can be permanently coupled, for example by rivets, to a fixed part of the home cooking appliance during the assembly process (e.g., early in the assembly process) prior to assembling the gas burner tube, thereby ensuring that the gas burner tube will be installed properly during the assembly process and also ensuring that the anti-rotational housing cannot be removed, for example, during installation at a customer site, when changing over to LP in the field, or during a service call to replace a gas burner tube and/or gas orifice, thereby avoiding the risk or possibility of an installer or technician inadvertently not re-installing the anti-rotational housing.

By acting like a secondary wrench when a portion of the gas supply orifice holder is disposed within the anti-rotational housing, the exemplary anti-rotational housing can stabilize and fix a position of the gas supply orifice holder and prevent rotation of the gas supply orifice holder when the gas supply line is installed, removed, and/or re-installed, thereby keeping the gas orifice centered and the gas burner assembly operating successfully. By acting like a secondary wrench, the exemplary anti-rotational housing also can allow the gas supply orifice holder to be simply and easily installed and correctly aligned, as well as removed from the anti-rotational housing and re-installed, during all phases throughout the lifetime of the home cooking appliance, for example, without the need for tools or secondary fasteners to directly fasten the gas supply orifice holder, and also can stabilize and fix a position of the gas supply orifice holder and prevent rotation of the gas supply orifice holder without fasteners directly fastening the gas supply orifice holder to a frame part.

Other features and advantages of the present invention will become apparent to those skilled in the art upon review of the following detailed description and drawings.

BRIEF DESCRIPTION OF THE DRAWINGS

These and other aspects and features of embodiments of the present invention will be better understood after a reading of the following detailed description, together with the attached drawings, wherein.

DETAILED DESCRIPTION OF THE EXEMPLARY EMBODIMENTS OF THE INVENTION

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

With reference to FIGS. 1-5, exemplary embodiments of an anti-rotational housing 200 for a home cooking appliance will first be described. An example of an anti-rotational housing 200 can include a body 204, 206, 208, 210 having a hollow interior space 202 accessible, for example, via two adjacent open sides such that a portion of a gas supply orifice holder (e.g., see gas supply orifice holder 300) can be received into the hollow interior space 202.

In the illustrated example, the anti-rotational housing 200 can include a box-shaped body having a plurality of sidewalls defining a top wall 206, a rear wall 210 adjacent to the top wall 206 and extending perpendicular to the top wall 206, a first side wall 204 adjacent to the top wall 206 and the rear wall 210 and extending perpendicular to each of the top wall 206 and the rear wall 210, a second side wall 208 adjacent to the top wall 206 and the rear wall 210 and extending perpendicular to each of the top wall 206 and the rear wall 210 and parallel to the first side wall 204, a bottom opening that is opposite the top wall 206, and a front opening that is opposite the rear wall 210 and adjacent to the bottom opening.

With reference again to FIGS. 1-5, an example of an embodiment of an anti-rotational housing 200 can include a mounting flange 212 or the like configured to couple the anti-rotational housing 200 to a fixed part of the home cooking appliance, such as a part of the burner front cover. The mounting flange 212 can include one or more openings 214 configured to receive one or more fasteners, such as one or more rivets, etc., to couple (e.g., permanently couple) the anti-rotational housing 200 to a fixed part of the home cooking appliance, such as a part of the burner front cover. The mounting flange 212 can include one or more cutouts 216 corresponding to one or more openings of the fixed part to minimize or avoid interference with airflow through such openings.

Figure 1:
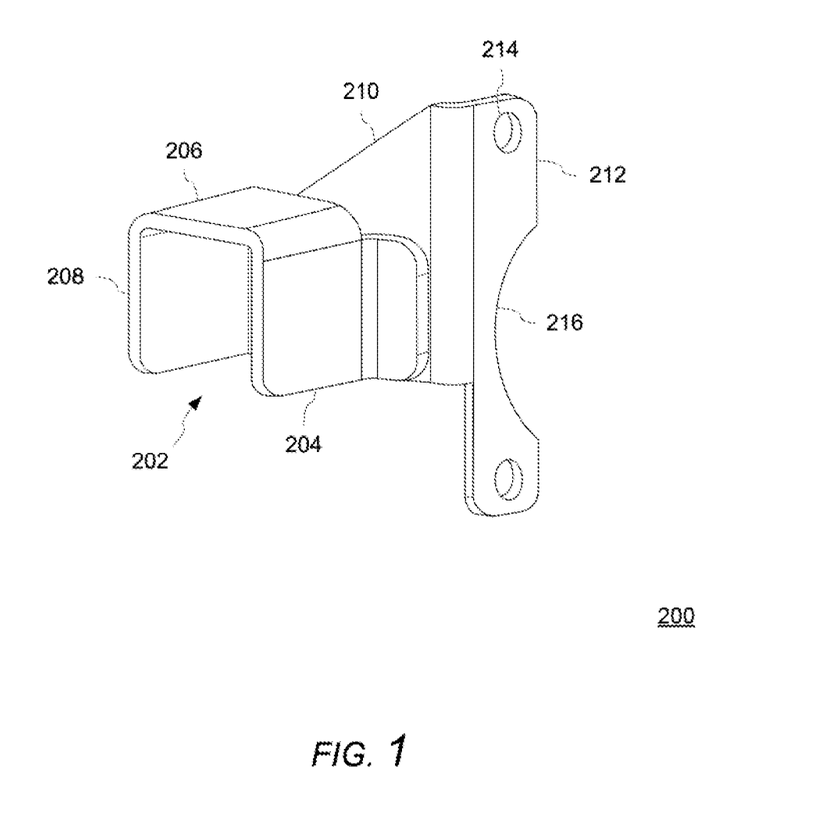
FIG. 1 is a perspective view of an anti-rotational housing according to an exemplary embodiment of the invention.
Figure 2:
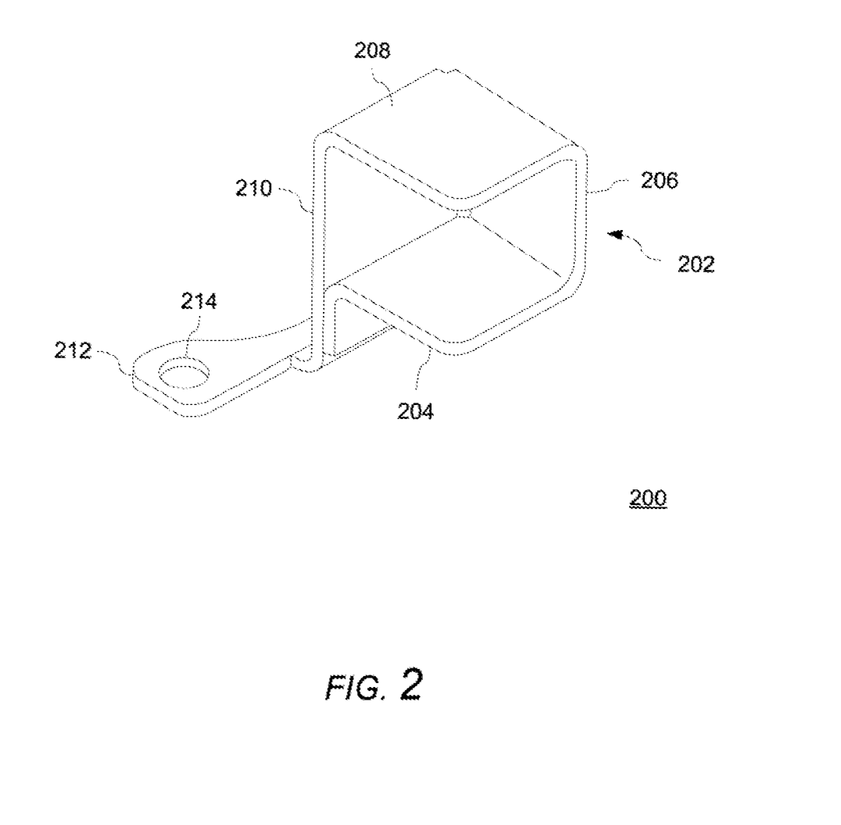
FIG. 2 is another perspective view of an anti-rotational housing according to an exemplary embodiment of the invention.
Figure 3:
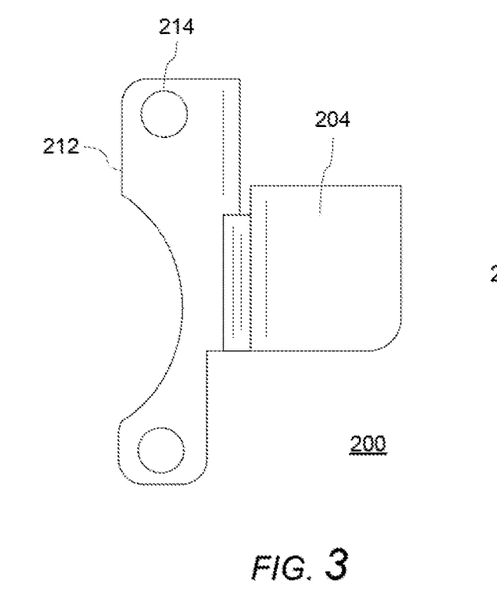
FIG. 3 is a side view of an anti-rotational housing according to an exemplary embodiment of the invention.
Figure 4:
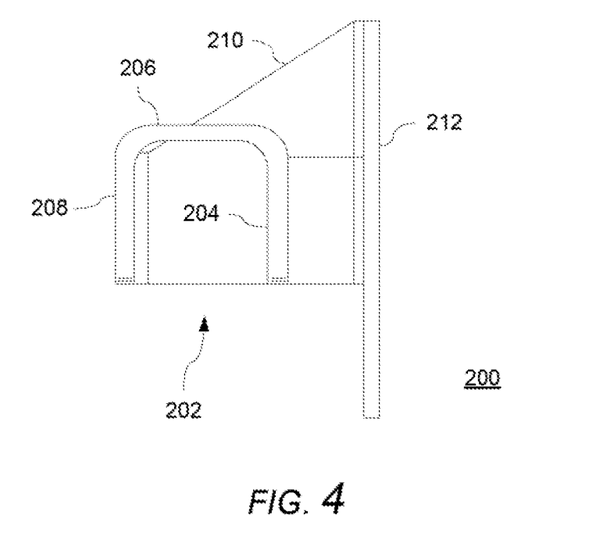
FIG. 4 is a front view of an anti-rotational housing according to an exemplary embodiment of the invention.
Figure 5:
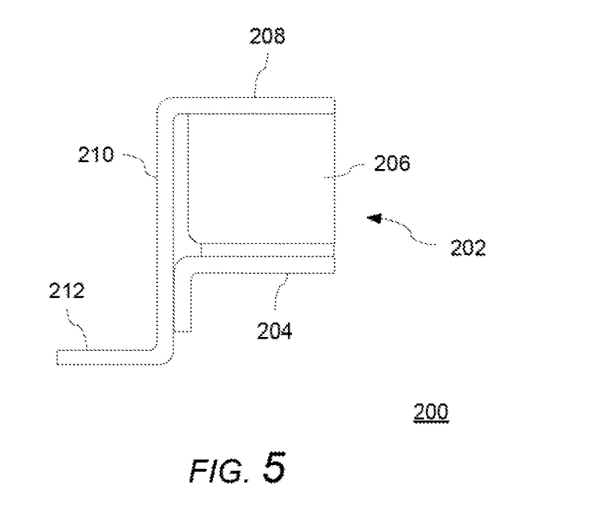
FIG. 5 is a top view of an anti-rotational housing according to an exemplary embodiment of the invention.
Figure 6:
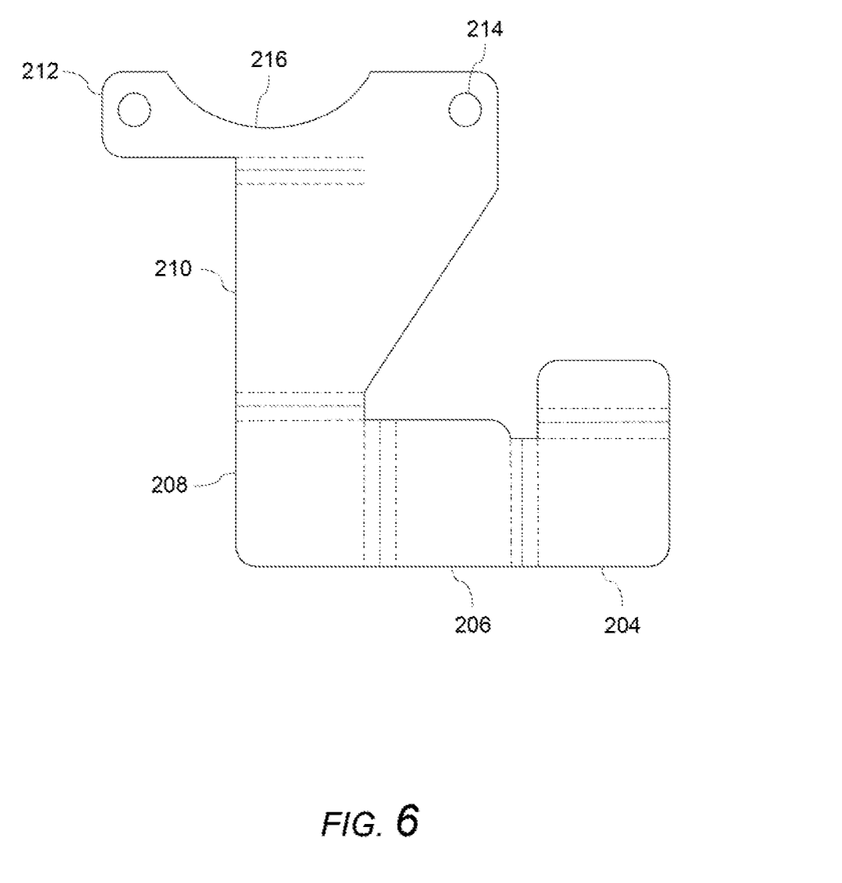
FIG. 6 is a plan view of plate pattern for an anti-rotational housing according to an exemplary embodiment of the invention.

With reference to FIG. 6, an exemplary embodiment of an anti-rotational housing 200 can be formed, for example, from a single, unitary part formed, for example, from a rigid material, such as steel (e.g., 14 gauge steel), and configured to be bent into a shape of a box-shaped body having a first sidewall 204, a top wall 206, a second side wall 208, a rear wall 210, and a mounting flange 212, and defining a bottom opening that is opposite the top wall 206, and a front opening that is opposite the rear wall 210 and adjacent to the bottom opening. One of ordinary skill in the art will recognize that other exemplary embodiments of an anti-rotational housing 200 can be formed by multiple parts. Other exemplary embodiments of an anti-rotational housing 200 can have different shapes and sizes, for example, depending on a size and/or shape of a particular gas supply orifice holder to be fixed by the anti-rotational housing 200.

Figure 7:
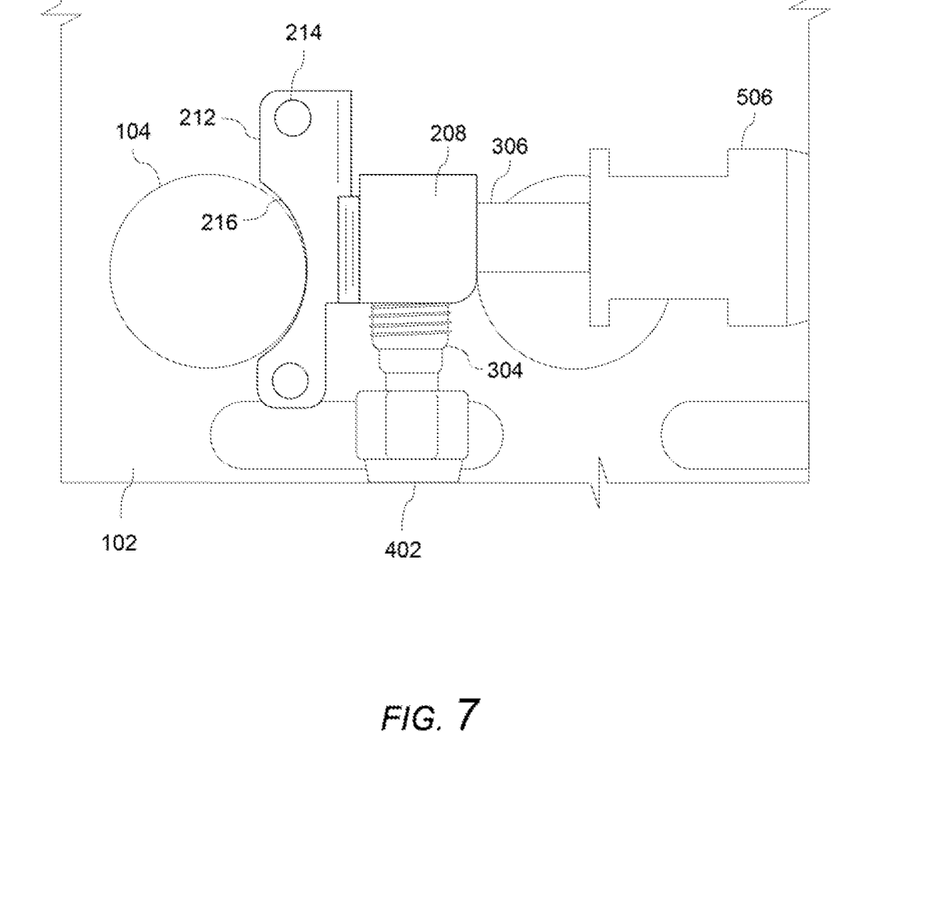
FIG. 7 is a partial side schematic view of a burner assembly of a home cooking appliance having an anti-rotational housing according to an exemplary embodiment of the invention.
Figure 8:
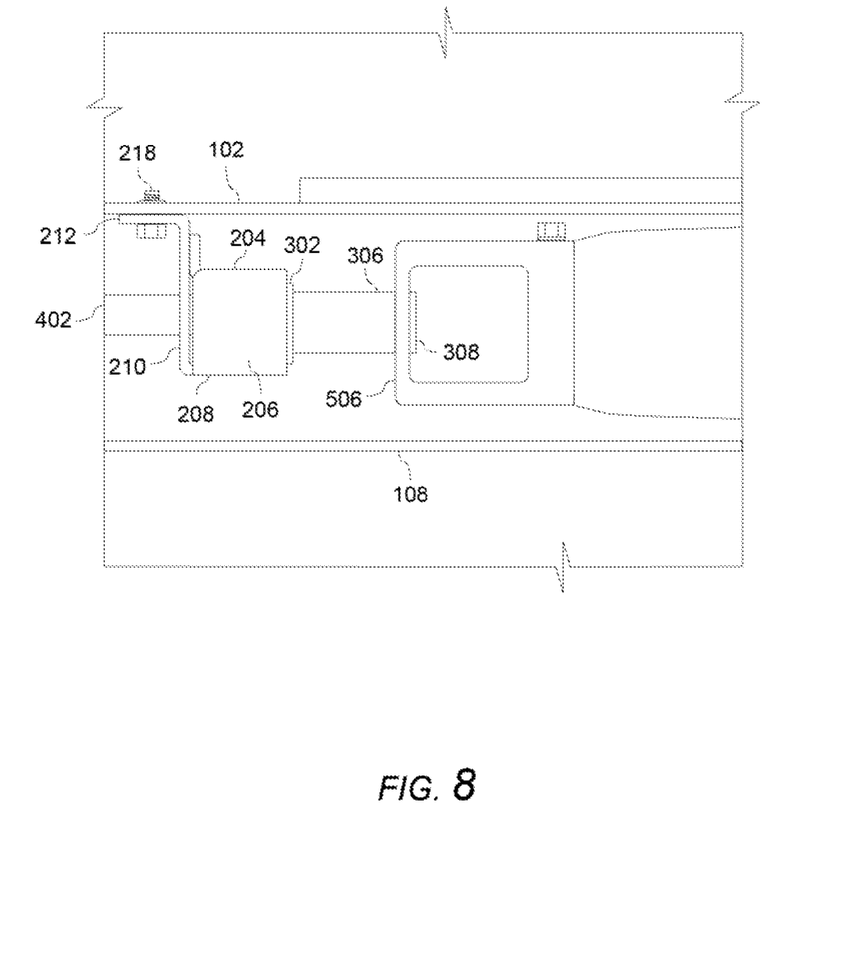
FIG. 8 is a partial top schematic view of a burner assembly of a home cooking appliance having an anti-rotational housing according to an exemplary embodiment of the invention.
Figure 9:
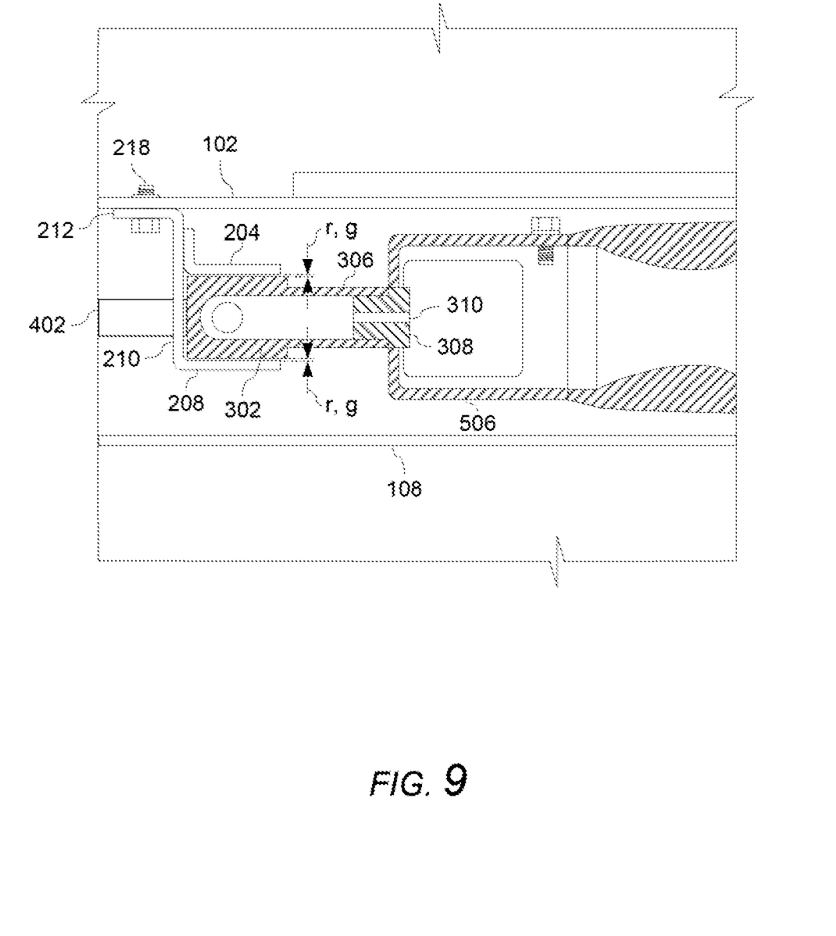
FIG. 9 is a cross-sectional schematic view of the burner assembly of FIG. 8.

With reference to FIGS. 7-9, examples of a gas burner assembly of a home cooking appliance having an anti-rotational housing 200 will be described. However, before describing the exemplary embodiments of an anti-rotational housing 200 according to the invention, the features of an example of a gas burner assembly will first be described with reference to FIGS. 10 and 11.

Figure 10:
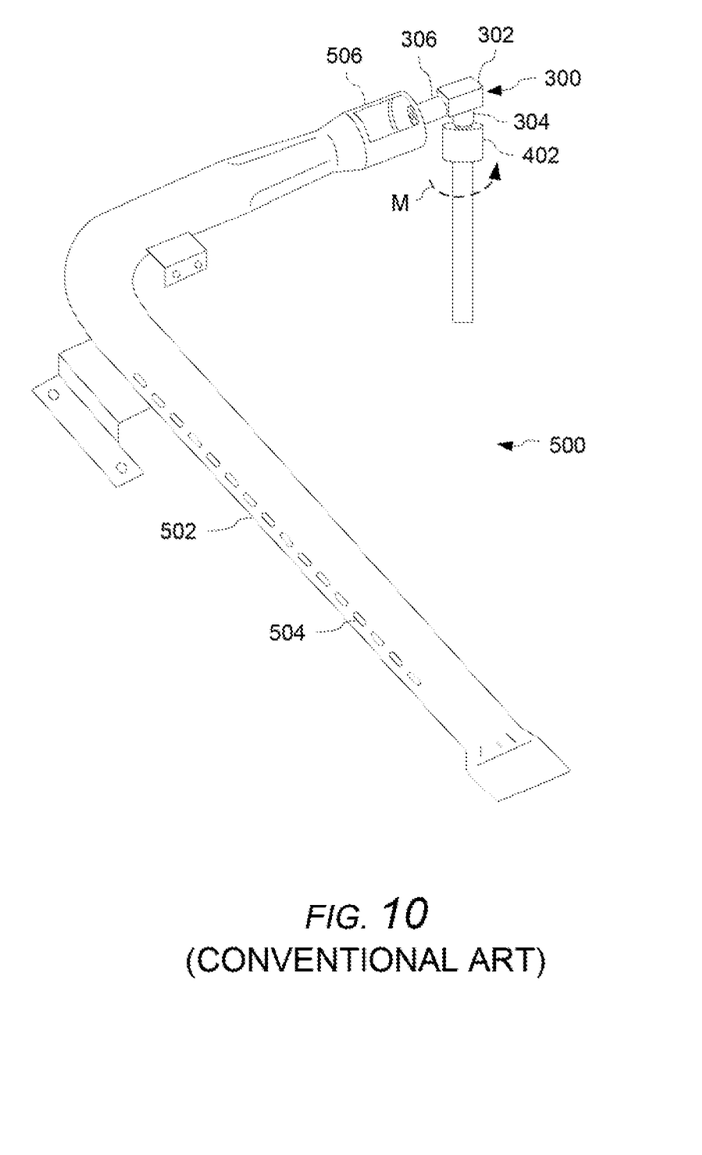
FIG. 10 is a partial perspective schematic view of a conventional burner assembly of a home cooking appliance.
Figure 11:
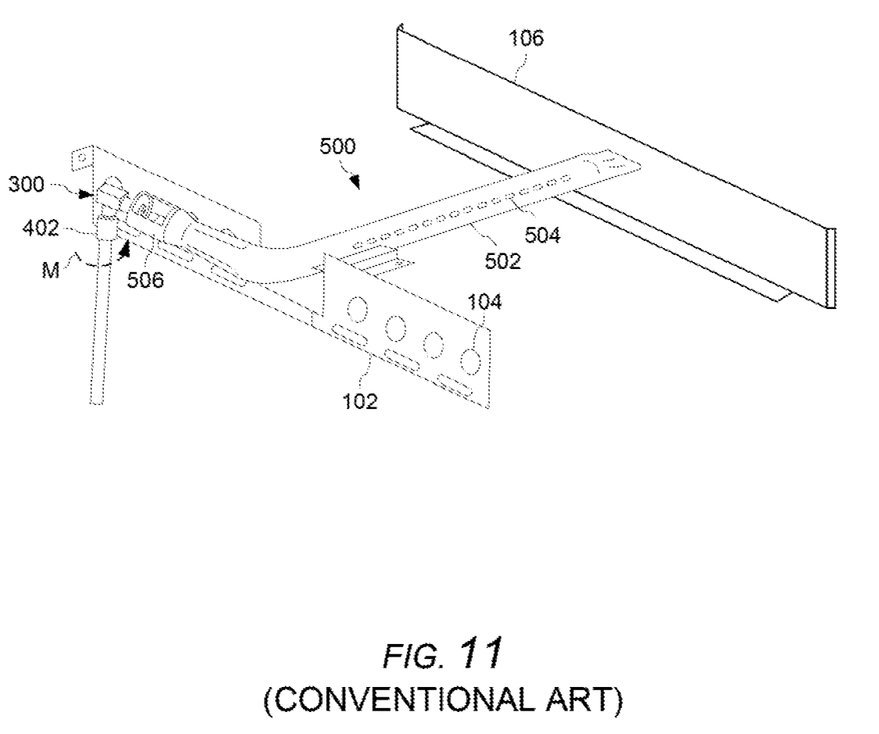
FIG. 11 is another partial perspective schematic view of a conventional burner assembly of a home cooking appliance.

An example of a conventional gas burner assembly 500 for a cooking compartment of a home cooking appliance can include a gas burner tube 502 having a plurality of burner ports or openings 504. The gas burner tube 502 can include a mixing portion 506 configured to receive a flow of gas and mix the gas with air to form an air-gas mixture. The gas burner assembly 500 can include a gas supply orifice holder 300 having a first end 304 coupled to a gas supply line 402 and a second end 306 having a gas supply orifice 308. The gas supply orifice holder 300 conveys the gas from the gas supply line 402 to the gas supply orifice 308, where the gas is injected from an opening 310 in the gas supply orifice 308 into the mixing portion 506 of the gas burner tube 502. The gas supply orifice holder 300 can include an elbow such that the first end 304 of the gas supply orifice holder 300 is disposed at an angle (e.g., a 90° angle) with respect to the second end 306 of the gas supply orifice holder 300. The gas burner assembly 500 can be disposed in the cooking compartment between a burner front cover 102 and a burner rear cover 106. The burner front cover 102 can include one or more openings 104 configured to permit airflow to the gas burner assembly 500 (e.g., primary airflow for mixing with the gas to supply the gas burner tube 502, 506 with an air-gas mixture and secondary airflow for combustion). A part of the gas burner assembly 500 can extend through an opening in the burner front cover and into a space between the burner front cover 102 and a wall 108 of the cooking compartment. One of ordinary skill in the art will recognize that other arrangements are possible.

During one or more phases throughout the lifetime of the home cooking appliance, the gas supply orifice holder 300 may be subjected to a bending moment (M) resulting from assembly and tightening of the gas supply line 402 onto the end 304 of the gas supply orifice holder 300. As a result, the gas supply orifice holder 300 (e.g., a long neck or elbow of gas supply orifice holder 300) may move out of center with respect to the gas burner tube 502 (e.g., the mixing portion 506 of the gas burner tube 502).

With reference to the examples illustrated in FIGS. 7-9, an exemplary embodiment of a gas burner assembly of a home cooking appliance can include an anti-rotational housing 200 fixing a position of the gas supply orifice holder 300 with respect to the gas burner tube 502 (e.g., the mixing portion 506 of the gas burner tube 502). In an exemplary embodiment, a portion of the gas supply orifice holder 300 can be disposed within the anti-rotational housing 200 and the gas supply orifice can be centered with respect to the gas burner tube 502, 506 when the portion of the gas supply orifice holder 300 is disposed within the anti-rotational housing 200. In an example, a bottom opening and a front opening of the anti-rotational housing 200 can cooperate to permit a portion of the gas supply orifice holder 300 to be received within the anti-rotational housing 200 without interfering with the gas supply orifice 308 supplying gas to the gas burner tube 502 and without interfering with the coupling of the gas supply line 402 to the gas supply orifice holder 300 while fixing the position (e.g., rotational position) of the gas supply orifice holder 300 with respect to the gas burner tube 502. The hollow interior space 202 of the anti-rotational housing 200 can have a size and shape that corresponds to a size and shape of a portion of the gas supply orifice holder 300 such that the anti-rotational housing 200 fixes the position (e.g., rotational position) of the gas supply orifice holder 300 with respect to the gas burner tube 502, 506. In some examples, the gas supply orifice holder 300 can include an elbow and a portion of the elbow can be disposed within the anti-rotational housing 200. The anti-rotational housing 200 can include a hollow interior space having a size and shape that corresponds to a size and shape of the elbow of the gas supply orifice holder 300 such that the anti-rotational housing 200 fixes the position (e.g., rotational position) of the gas supply orifice holder 300 with respect to the gas burner tube 502, 506.

As shown in FIGS. 7-9, the anti-rotational housing 200 can be fit over the gas supply orifice holder 300 (or, vice versa, the gas supply orifice holder 300 can be fit into the anti-rotational housing 200), thereby fixing a position of the gas supply orifice holder 300 with respect to the anti-rotational housing 200 and correspondingly fixing a position of the gas supply orifice holder 300 with respect to the gas burner tube 502, 506. The anti-rotational housing 200 can be configured to provide a predetermined maximum gap (g) between a portion (e.g., elbow) of the gas supply orifice holder 300 that is disposed within the anti-rotational housing 200 and an inner wall of the anti-rotational housing 200. The predetermined maximum gap (g) can be, for example, 0.5 mm, 1 mm, or within a range of 0.5 mm to 1 mm. The anti-rotational housing 200 can limit rotational movement of the gas supply orifice holder 300 with respect to the gas burner tube 502, 506 to a predetermined maximum rotational movement (r) of, for example, 0.5 mm, 1 mm, or within a range of 0.5 mm to 1 mm.

In addition to limiting rotational movement of the gas supply orifice holder 300 with respect to the gas burner tube 502, 506, an example of the anti-rotational housing 200 can be configured to limit movement of the gas supply orifice holder 300 in at least one other direction, such as in a direction corresponding to a longitudinal direction of the gas burner tube 502, 506, and more particularly, in a direction extending away from the gas burner tube 502, 506 toward the rear wall 210 of the anti-rotational housing 200.

In the illustrated examples, a mounting flange 212 of the anti-rotational housing 200 can include one or more openings 214 and can be coupled (e.g., permanently coupled) to a fixed part of the home cooking appliance, such as a part of the burner front cover 102, by one or more fasteners, such as one or more rivets, etc. 218. As shown in FIG. 7, the mounting flange 212 can include one or more cutouts 216 corresponding to one or more openings 104 of the burner front cover 102 to minimize or avoid interference with airflow through such openings 104.

The embodiments of the anti-rotational housing 200 are not limited to the illustrated examples. Other arrangements of the anti-rotational housing 200 within the spirit and scope of the invention can be configured to fit over a gas supply orifice holder 300 having a different shape and/or arrangement (e.g., a gas supply orifice holder 300 having an elbow with a different angle, a gas supply orifice holder 300 without an elbow, etc.), or vice versa, a gas supply orifice holder 300 having a different shape and/or arrangement can be fit into a correspondingly arranged anti-rotational housing 200, thereby acting like a secondary wrench when a portion of the gas supply orifice holder 300 is disposed within the anti-rotational housing 200 and stabilizing and fixing a position of the gas supply orifice holder 300 and preventing rotation of the gas supply orifice holder 300 when the gas supply line 402 is installed, removed, and/or re-installed in order to keep the gas orifice centered and the gas burner assembly 500 operating successfully.

The present invention has been described herein in terms of several preferred embodiments. However, modifications and additions to these embodiments will become apparent to those of ordinary skill in the art upon a reading of the foregoing description. It is intended that all such modifications and additions comprise a part of the present invention to the extent that they fall within the scope of the several claims appended hereto.

What is claimed is:

1. A home cooking appliance comprising:
    a cooking compartment;
    a gas burner tube in the cooking compartment;
    a gas supply orifice holder coupled to a gas supply line at a first end and having a gas supply orifice at a second end, the gas supply orifice configured to inject gas from the gas supply line into the gas burner tube; and
    an anti-rotational housing fixing a position of the gas supply orifice holder with respect to the gas burner tube, wherein the anti-rotational housing includes a box-shaped body having a plurality of sidewalls defining:
    a top wall;
    a rear wall adjacent to the top wall and extending perpendicular to the top wall;
    a first side wall adjacent to the top wall and the rear wall and extending perpendicular to each of the top wall and the rear wall;
    a second side wall adjacent to the top wall and the rear wall and extending perpendicular to each of the top wall and the rear wall and parallel to the first side wall,
    a bottom opening that is opposite the top wall; and
    a front opening that is opposite the rear wall and adjacent to the bottom opening.

2. The home cooking appliance of claim 1, wherein the anti-rotational housing includes a box-shaped body having two adjacent open sides.

3. The home cooking appliance of claim 1, wherein a portion of the gas supply orifice holder is disposed within the anti-rotational housing.

4. The home cooking appliance of claim 3, wherein the gas supply orifice is centered with respect to the gas burner tube when the portion of the gas supply orifice holder is disposed within the anti-rotational housing.

5. The home cooking appliance of claim 3, wherein the anti-rotational housing includes a hollow interior space having a size and shape that corresponds to a size and shape of the portion of the gas supply orifice holder such that the anti-rotational housing fixes the position of the gas supply orifice holder with respect to the gas burner tube.

6. The home cooking appliance of claim 5, wherein the anti-rotational housing includes two adjacent open sides.

7. The home cooking appliance of claim 3, wherein a predetermined maximum gap between the portion of the gas supply orifice holder that is disposed within the anti-rotational housing and an inner wall of the anti-rotational housing is 1 mm.

8. The home cooking appliance of claim 3, wherein a predetermined maximum gap between the portion of the gas supply orifice holder that is disposed within the anti-rotational housing and an inner wall of the anti-rotational housing is 0.5 mm.

9. The home cooking appliance of claim 3, wherein a predetermined maximum gap between the portion of the gas supply orifice holder that is disposed within the anti-rotational housing and an inner wall of the anti-rotational housing is within a range of 0.5 mm to 1 mm.

10. The home cooking appliance of claim 1, wherein the anti-rotational housing limits rotational movement of the gas supply orifice holder with respect to the gas burner tube to a predetermined maximum rotational movement.

11. The home cooking appliance of claim 10, wherein the predetermined maximum rotational movement is 1 mm.

12. The home cooking appliance of claim 10, wherein the predetermined maximum rotational movement is 0.5 mm.

13. The home cooking appliance of claim 10, wherein the predetermined maximum rotational movement is within a range of 0.5 mm to 1 mm.

14. The home cooking appliance of claim 1, wherein the anti-rotational housing includes a mounting flange configured to couple the anti-rotational housing to a fixed part of the home cooking appliance.

15. The home cooking appliance of claim 14, wherein the fixed part includes an opening configured to permit airflow and the mounting flange includes at least one cutout corresponding to the opening of the fixed part to avoid interference with the air flow through the opening.

16. A home cooking appliance comprising:
    a cooking compartment;
    a gas burner tube in the cooking compartment;
    a gas supply orifice holder coupled to a gas supply line at a first end and having a gas supply orifice at a second end, the gas supply orifice configured to inject gas from the gas supply line into the gas burner tube; and
    an anti-rotational housing fixing a position of the gas supply orifice holder with respect to the gas burner tube,
    wherein the gas supply orifice holder includes an elbow such that the first end of the gas supply orifice holder is disposed at an angle with respect to the second end of the gas supply orifice holder, and wherein a portion of the elbow is disposed within the anti-rotational housing.

17. The home cooking appliance of claim 16, wherein the angle is a 90° angle.

18. The home cooking appliance of claim 16, wherein the gas supply orifice is centered with respect to the gas burner tube when the portion of the elbow is disposed within the anti-rotational housing.

19. The home cooking appliance of claim 16, wherein the anti-rotational housing includes a hollow interior space having a size and shape that corresponds to a size and shape of the portion of the gas supply orifice holder such that the anti-rotational housing fixes the position of the gas supply orifice holder with respect to the gas burner tube.

* * * * *